Aug. 2, 1949.  R. O. MONROE  2,477,762
NIPPLE ASSEMBLY
Filed March 8, 1946
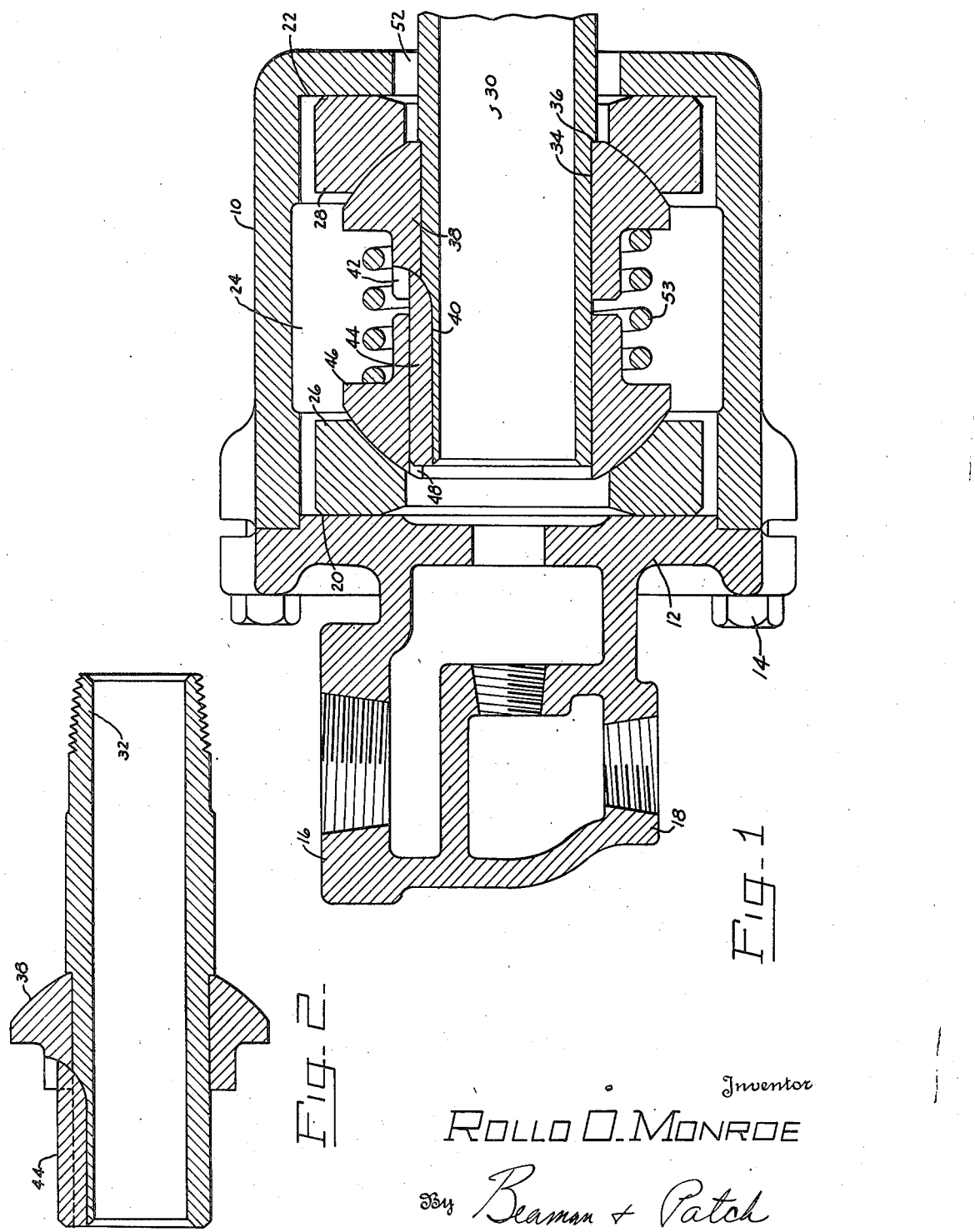
Inventor
ROLLO O. MONROE
By Beaman & Patch
Attorneys Patented Aug. 2, 1949

2,477,762

UNITED STATES PATENT OFFICE 2,477,762

NIPPLE ASSEMBLY

Rollo O. Monroe, Three Rivers, Mich., assignor to The Johnson Corporation, Three Rivers, Mich., a corporation of Michigan Application March 8, 1946, Serial No. 652,881

1 Claim. (Cl. 285—91)

The present invention relates to improvements in rotary joints of the type disclosed in U. S. Patent No. 1,929,635 and Patent No. 2,352,317.

In rotary joints of the above-identified type, a nipple is provided which supplies steam to the rotary drum and is driven thereby. This nipple carries a pair of spherical sealing segments, one of which is fixed on the nipple against relative axial movement and the other is axially movable under the action of a spring.

In service, rotary joints of the above described type are subject to wide temperature changes, substantial vibration, and relatively high stresses due to misalignment. Using cast iron nipples of the general type disclosed in the aforesaid patents, considerable breakage has been experienced, particularly in the smaller sized nipples, namely, ½", ¾" and 1" and on certain types of machines even larger sizes, as for example, 1¼" and 1½", especially when used on corrugators.

In an attempt to reduce breakage of nipples in service, it has been proposed to make a nipple with a cast spherical sealing segment having an integral hub upon which a relatively slidable spherical sealing segment is mounted, and then threading a short length of steel tubing or pipe to the cast part of the assembly. This construction, while an improvement over the all-cast nipple, is expensive to manufacture and assemble and necessitated the riveting of a keyway to the cast hub and pinning the steel tubing to the cast structure.

According to the present invention, an improved nipple assembly for rotary joints has been provided by selecting a thick walled piece of seamless steel tubing or extra heavy pipe, threading the end which is connected to the rotary drum, reducing the diameter of the opposite end for a substantial distance to provide a cylindrical portion terminating with a shoulder, press-fitting a cast spherical sealing segment upon the cylindrical portion and against the shoulder, machining a keyway into said cylindrical portion and partially into the cast segment and then brazing a key in place in the keyway to hold the press-fitting segments against relative rotation and to provide a drive for the axially slidable cast spherical sealing segment. In practice, this new assembly has eliminated breakage of nipples in service, is capable of being inexpensively manufactured, and the reconditioning of the nipple by the replacement of worn out parts is materially facilitated.

Thus, one of the objects of the present invention resides in an improved nipple for rotary joints characterized by its longer life in service, its simplicity of manufacture, and the ease of reconditioning.

Another object of the invention is to provide an improved nipple for rotary joints in which the cast-iron spherical sealing segments are mounted upon a steel tubing.

Another object of the invention is to provide an improved nipple for rotary joints in which a section of steel tubing is threaded on one end, a cast-iron spherical sealing segment is press-fitted upon the opposite end and a brazed drive key is provided for driving a spring stressed axially movable cast-iron spherical sealing segment.

These and other objects and advantages residing in the combination and arrangement and construction of parts will be more fully disclosed in the following specification and claim.

In the drawings,

Fig. 1 is a cross-sectional view of the rotary joint embodying the present invention, and Fig. 2 is a side elevational view in vertical cross-section of a portion of the nipple assembly.

The rotary joint illustrated in Fig. 1 comprises a main cast portion 10 having a head 12 at one end secured by screws 14. The head 12 has, as an integral part thereof, the inlet 16 and the outlet 18. Sealing surfaces 20 and 22 are provided by the opposed walls at opposite ends of the chamber 24. Sealing rings 26 and 28 have vertical movement along the walls 20 and 22, respectively, to compensate for misalignment and gyrations of the nipple assembly.

My improved nipple construction comprises a length of seamless steel tubing 30 threaded at 32 at one end. Extra heavy pipe may also be used. The opposite end is machined to provide a cylindrical portion 34 of reduced diameter terminating in a shoulder 36. In practice, the diameter of the cylindrical portion 34 is machined to very close tolerances to permit the cast-iron spherical sealing segment 38 to be press-fitted upon the cylindrical portion 34 and up against the shoulder 36.

After the segment 38 is press-fitted upon the cylindrical portion 34, a keyway 40 is milled in the tubing 30 and partially into the segment 38 as indicated at 42. A key 44 preferably of stainless steel is then brazed into the keyway 40 preferably by employing silver solder. The axially slidable spherical sealing segment 46 is axially slidable on the cylindrical portion 34 and is provided with a slot 48 to slidably receive the key 44 so as to be driven thereby. The spring 50 continuously acts to bias the sealing segments 46 toward the sealing ring 26. It will be noted that the sealing rings 26 and 28 have complementary spherical segmental faces with which the segments 38 and 46 engage with universal ball and socket action within the limits of the opening 52 through which the tubing 30 extends toward the drying drum.

The nipple construction just described not only is substantially unbreakable in service, but it may be inexpensively fabricated and assembled. Moreover, by brazing the key 44 in position, the key may be readily removed by heating the brazed joint and the sealing segment 38 may be removed and replaced without difficulty.

Having thus described my invention, what I claim as new and desire to cover by Letters Patent is:

In a rotary joint, a nipple comprising a length of metal tubing threaded at one end and having a smooth reduced external diameter along its opposite end and terminating in a radial shoulder, a metal spherical sealing segment having a bore portion press fitted into fluid sealing relationship with said reduced tube portion, said segment being located against said shoulder, an axially extending keyway in said reduced tube end and extending from the outer end of the latter up to and partly into said press fitted segment, a detachable key located in said keyway and extending therealong into said press fitted segment portion of the keyway, whereby positively locking the press fitted segment against rotation relatively to the tube, a second spherical sealing segment slidably mounted upon said reduced tube end portion and the key, the said key providing the rotary driving connection between the axially slidable segment and the tube, and a spring extending between the two said segments and biasing the one segment for axial relative movement upon the reduced tube portion.

ROLLO O. MONROE.

REFERENCES CITED

The following references are of record in the file of this patent:

UNITED STATES PATENTS

| Number | Name | Date |
|---|---|---|
| 1,929,635 | Goff | Oct. 10, 1933 |
| 2,352,317 | Goff et al. | June 27, 1944 |